United States Patent
Glatfelter

(10) Patent No.: US 10,377,212 B2
(45) Date of Patent: Aug. 13, 2019

(54) DYNAMIC ANTI-GLARE SYSTEM FOR A WINDSHIELD OF A VEHICLE

(71) Applicant: The Boeing Company, Chicago, IL (US)

(72) Inventor: John W. Glatfelter, West Chester, PA (US)

(73) Assignee: The Boeing Company, Chicago, IL (US)

( * ) Notice: Subject to any disclaimer, the term of this patent is extended or adjusted under 35 U.S.C. 154(b) by 33 days.

(21) Appl. No.: 15/675,057

(22) Filed: Aug. 11, 2017

(65) Prior Publication Data

US 2019/0047382 A1 Feb. 14, 2019

(51) Int. Cl.
*B60J 3/02* (2006.01)
*B60R 1/00* (2006.01)

(52) U.S. Cl.
CPC ...... *B60J 3/02* (2013.01); *B60R 1/00* (2013.01); *B60R 2300/105* (2013.01)

(58) Field of Classification Search
CPC .... G02B 2027/0118; G02B 2027/0138; G02F 1/01
See application file for complete search history.

(56) References Cited

U.S. PATENT DOCUMENTS

| | | | | |
|---|---|---|---|---|
| 4,717,248 A * | 1/1988 | LaRussa | ............ | G02B 17/023 345/7 |
| 9,321,329 B2 * | 4/2016 | Beckman | ............... | G02B 27/01 |
| 2003/0169213 A1 * | 9/2003 | Spero | ...................... | G02B 5/20 345/7 |
| 2004/0139100 A1 * | 7/2004 | Gottsman | ......... | G06F 17/30398 |
| 2005/0232469 A1 * | 10/2005 | Schofield | ........... | G06K 9/00818 382/104 |
| 2006/0061008 A1 * | 3/2006 | Karner | ................ | B29C 45/0017 264/250 |
| 2006/0176165 A1 * | 8/2006 | DeLine | .................. | B60K 35/00 340/461 |

(Continued)

FOREIGN PATENT DOCUMENTS

WO WO-2016147486 A1 * 9/2016 ............. B60K 35/00

OTHER PUBLICATIONS

Auto-dimming electrochromic panels reduce glare when driving (video); https://www.engadget.com/2010/05/15/; Jul. 11, 2017.

(Continued)

*Primary Examiner* — Gandhi Thirugnanam
(74) *Attorney, Agent, or Firm* — Duft & Bornsen, PC

(57) ABSTRACT

Systems and methods for dynamic anti-glare for a windshield of a vehicle. One embodiment is a system that includes a camera to capture image data of an environment in front of the vehicle, a projector to display an image on the windshield, and a sensor to monitor light intensity for an area of the windshield. The system also includes a controller that, in response to detecting glare impinging on the area of the windshield via the sensor, analyzes the image data captured for the area of the windshield, determines a location of the glare in the area based on the image data, determines a characteristic of the environment for the area based on the image data, generates a counteracting image based on the characteristic of the environment for the area, and directs the projector to display the counteracting image on the location of the windshield to reduce the glare.

17 Claims, 9 Drawing Sheets

(56) References Cited

U.S. PATENT DOCUMENTS

| | | |
|---|---|---|
| 2009/0058126 A1 | 3/2009 | Broude et al. |
| 2009/0204291 A1 | 8/2009 | Cernasov |
| 2012/0268626 A1* | 10/2012 | Lu .................. H04N 5/2256 348/241 |
| 2013/0300911 A1* | 11/2013 | Beckman .......... G02B 27/0101 348/335 |
| 2015/0077826 A1* | 3/2015 | Beckman ............ G02B 27/01 359/238 |
| 2016/0109701 A1* | 4/2016 | Goldman-Shenhar ................ G02B 27/01 345/8 |
| 2016/0357014 A1* | 12/2016 | Beckman ............ G02B 27/01 |
| 2017/0038585 A1* | 2/2017 | Martinez ............. B60R 1/001 |
| 2018/0017791 A1* | 1/2018 | Beckman ............ G02B 27/01 |
| 2018/0056871 A1* | 3/2018 | Karner ................ B60R 1/06 |
| 2018/0111451 A1* | 4/2018 | Martens ............. B60J 3/04 |
| 2018/0155902 A1* | 6/2018 | Fujita ................. B60K 35/00 |
| 2018/0157035 A1* | 6/2018 | Fujita ................. B60K 35/00 |
| 2019/0047382 A1* | 2/2019 | Glatfelter ............ B60J 3/02 |

OTHER PUBLICATIONS

Jason A. Rogers et al; Federal Aviation Administration report; Evaluation of Glare as a Hazard for General Aviation Pilots on Final Approach; Jul. 2015.

* cited by examiner

DYNAMIC ANTI-GLARE SYSTEM FOR A WINDSHIELD OF A VEHICLE

FIELD

The disclosure relates to vehicles, and in particular, to reducing glare for vehicle windshields.

BACKGROUND

Vehicle operators often experience glare from oncoming headlights and the sun. Existing devices, such as sun visors, are only effective during the day and for limited areas of the windshield. More advanced glare-reducing systems include technology that controllably dims the window, but these systems undesirably block or reduce the visibility of objects in the environment (e.g., road lines) that may be important for safely operating the vehicle.

SUMMARY

Embodiments herein describe glare prevention for a windshield of a vehicle. A projector inside the vehicle is dynamically controlled to counteract glare and bright light sources. Images from the projector blend glare on the windshield with the observable environment outside the vehicle to reduce eye strain for the vehicle operator. In addition to reducing contrast between glare and the environment, the projected images may increase contrast for particular objects in the environment to further improve visibility for the operator.

One embodiment is an anti-glare system for a windshield of a vehicle. The anti-glare system includes a camera configured to capture image data of an environment in front of the vehicle, a projector configured to display an image on the windshield, and a sensor configured to monitor light intensity for an area of the windshield. The anti-glare system includes a controller that is configured to, in response to detecting glare impinging on the area of the windshield via the sensor, analyze the image data captured for the area of the windshield, determine a location of the glare in the area based on the image data, and determine a characteristic of the environment for the area based on the image data. The controller is further configured to generate a counteracting image based on the characteristic of the environment for the area, and to direct the projector to display the counteracting image on the location of the windshield to reduce the glare.

Other exemplary embodiments (e.g., methods, systems, and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific exemplary embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
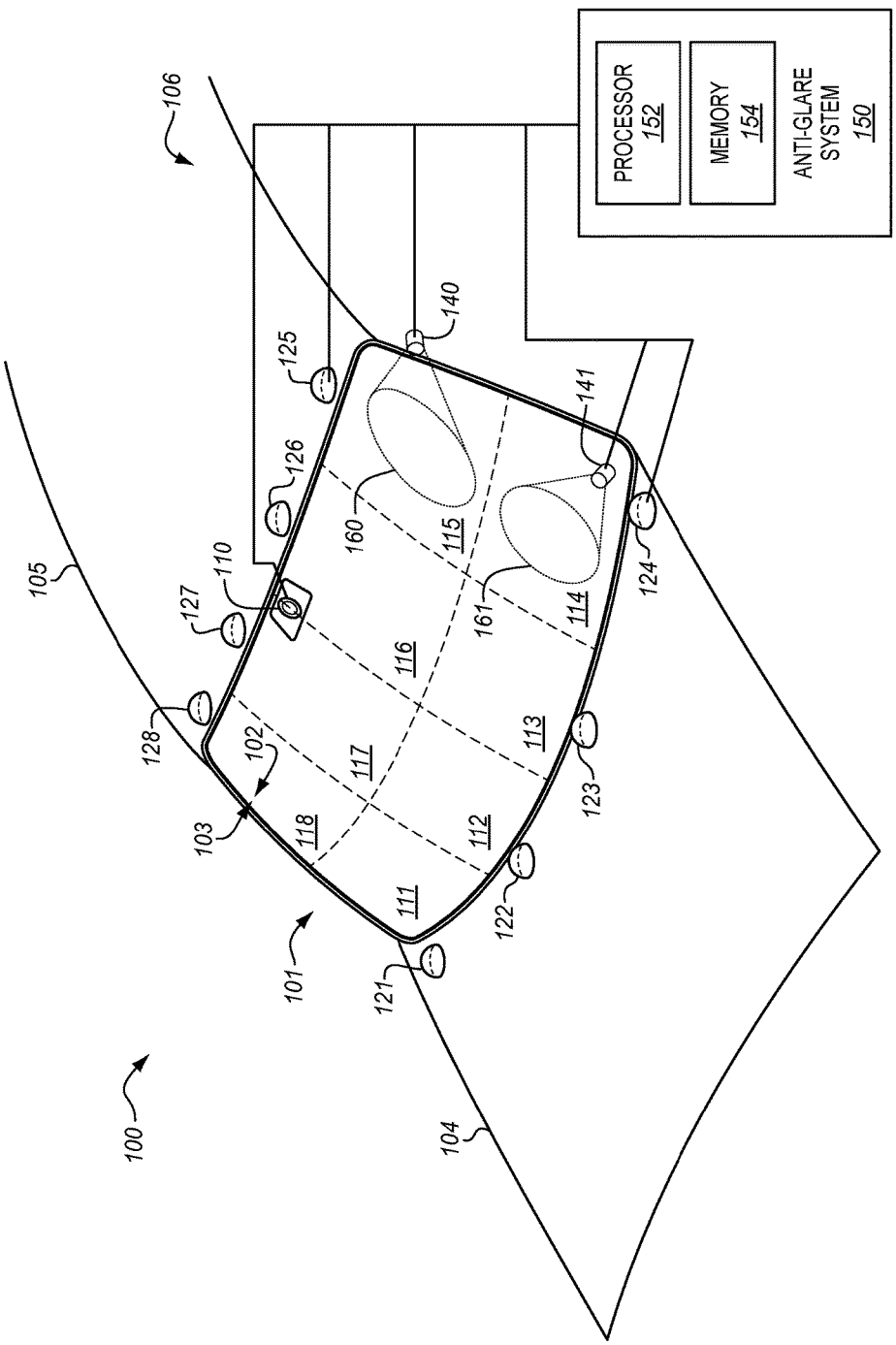
FIG. 1 is a perspective view of a vehicle in an exemplary embodiment.

FIG. 1 is a perspective view of a vehicle 100 in an exemplary embodiment. The vehicle 100 may comprise an aircraft (e.g., airplane, helicopter, etc.), a ground vehicle (e.g., car, motorcycle, etc.), or other type of vehicle. In general, the vehicle 100 includes a windshield 101 having an interior side 102 and an exterior side 103. The vehicle 100 may also include a nose 104 (or hood) and a roof 105 that defines a cabin 106 for one or more vehicle operators and/or vehicle passengers. The windshield 101 is generally transparent to pass light emanating from objects outside the vehicle 100 into the cabin 106. Unfortunately, light sources such as the sun or oncoming headlights may create glare on the windshield 101 that negatively impacts visibility of the vehicle occupants.

The vehicle 100 is therefore enhanced with an anti-glare system 150 that is communicatively coupled with one or more cameras 110, one or more optical sensors 121-128, and one or more projectors 140-141. The communication medium for the anti-glare system 150 to any other component may be a wired or wireless connection. The camera 110 may include any system or device operable to capture image data (e.g., pictures and/or videos) of a scene. The optical sensors 121-128 may include any system or device operable to convert light, or a change in light, into electronic signals. For instance, the optical sensors 121-128 may include visual light sensors, infrared sensors, photovoltaic sensors, photo diodes, or other light dependent sensors. The projectors 140-141 may include any system or device operable to project images 160-161 onto the windshield 101. Examples of the projectors 140-141 include Heads-Up Displays (HUDs) and mini Liquid-Crystal Display (LCD) projectors.

In general, the optical sensors 121-128 divide the windshield 101 into zones 111-118 that are individually addressable by the anti-glare system 150. That is, each of the optical sensors 121-128 may be attached to the vehicle 100 at different locations to define the zones 111-118 of the windshield 101. The optical sensors 121-128 and/or the camera(s) 110 may be mounted to an interior of the vehicle 100 (e.g., in the cabin 106) or the exterior of the vehicle 100 (e.g., on the nose 104 or the roof 105). The projectors 140-141 may be mounted in the cabin 106 to project respective images 160-161 toward the interior side 102 of the windshield 101. The projectors 140-141 may each be assigned to one or more of the zones 111-118 for which it projects images 160-161 to reduce glare. It will be appreciated that vehicle 100 as shown and described is exemplary for purposes of discussion and illustration, and that alternative arrangements, configurations, and number of components (e.g., the camera 110, the optical sensors 121-128, and/or the projectors 140-141) are possible.

While the specific hardware implementation of the anti-glare system 150 is subject to design choices, one particular embodiment may include one or more processors 152 coupled with a memory 154. The processor 152 includes any electronic circuits and/or optical circuits that are able to perform functions. For example, a processor may include one or more Central Processing Units (CPU), microprocessors, Digital Signal Processors (DSPs), Application-Specific Integrated Circuits (ASICs), Programmable Logic Devices (PLD), control circuitry, etc. Some examples of processors include Intel Core processors, Advanced Reduced Instruction Set Computing (RISC) Machines (ARM) processors, etc. The memory 154 includes any hardware device that is able to store data. The memory 154 may include one or more volatile or non-volatile Dynamic Random Access Memory (DRAM) devices, FLASH devices, volatile or non-volatile Static RAM devices, hard drives, Solid State Disks (SSDs), etc. Some examples of non-volatile DRAM and SRAM include battery-backed DRAM and battery-backed SRAM. Additional details of operation of the anti-glare system 150 are described below.

Figure 2:
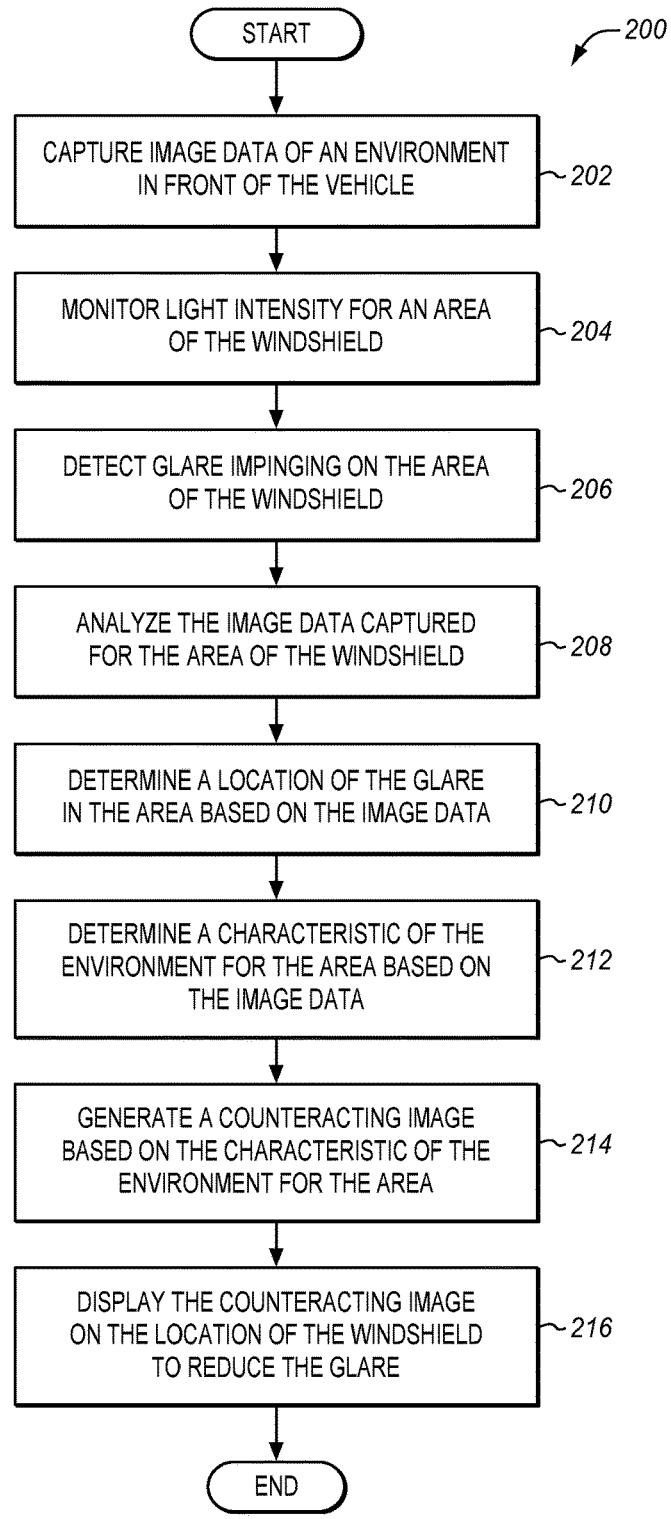
FIG. 2 is a flowchart of a method for reducing glare on a windshield of a vehicle in an exemplary embodiment.

FIG. 2 is a flowchart of a method 200 for reducing glare on the windshield 101 of the vehicle 100 in an exemplary embodiment. The steps of method 200 will be described with reference to FIG. 1, but those skilled in the art will appreciate that method 200 may be performed in other systems. The steps of the flowchart(s) described herein are not all inclusive and may include other steps not shown. The steps described herein may also be performed in an alternative order.

In step 202, the camera(s) 110 capture image data of an environment in front of the vehicle 100. That is, one or more of the cameras 110 may obtain an image of a field of view that is in front of the windshield 101. In step 204, one or more of the optical sensors 121-128 monitor light intensity for an area (e.g., one of the zones 111-118) of the windshield 101. In step 206, the processor 152 of the anti-glare system 150 detects glare impinging on the area of the windshield 101. The processor 152 may obtain sensor data from one or more optical sensors 121-128 and/or image data from one or more cameras 110 to detect the glare.

In step 208, the processor 152 analyzes the image data captured for the area of the windshield 101. In step 210, the processor 152 determines a location of the glare in the area based on the image data. In step 212, the processor 152 determines a characteristic of the environment for the area based on the image data. For example, the processor 152 may process the image data to detect a dominant color, a luminance or brightness value, and/or an object in the environment that is within the field of view of the camera 110. The processor 152 may activate and/or direct the camera 110 to capture the image data in response to detecting the glare via the sensor(s) 121-128. For instance, the processor 152 may instruct the camera 110 to obtain image data for a particular one of the zones 111-118 of the windshield 101 for which glare has been detected. Alternatively or additionally, the processor 152 may continuously receive image data from the camera 110 and/or extract image data corresponding to one or more of the zones 111-118 of the windshield 101 for which glare has been detected.

In step 214, the processor 152 generates a counteracting image based on the characteristic of the environment for the area. And, in step 216, the processor 152 directs one or more of the projectors 140-141 to display the counteracting image on the location of the windshield to reduce the glare. Steps 202-216 may be repeated as necessary for the anti-glare system 150 to continuously reduce glare for an occupant of the vehicle 100. Additional examples are described below.

Figure 3:
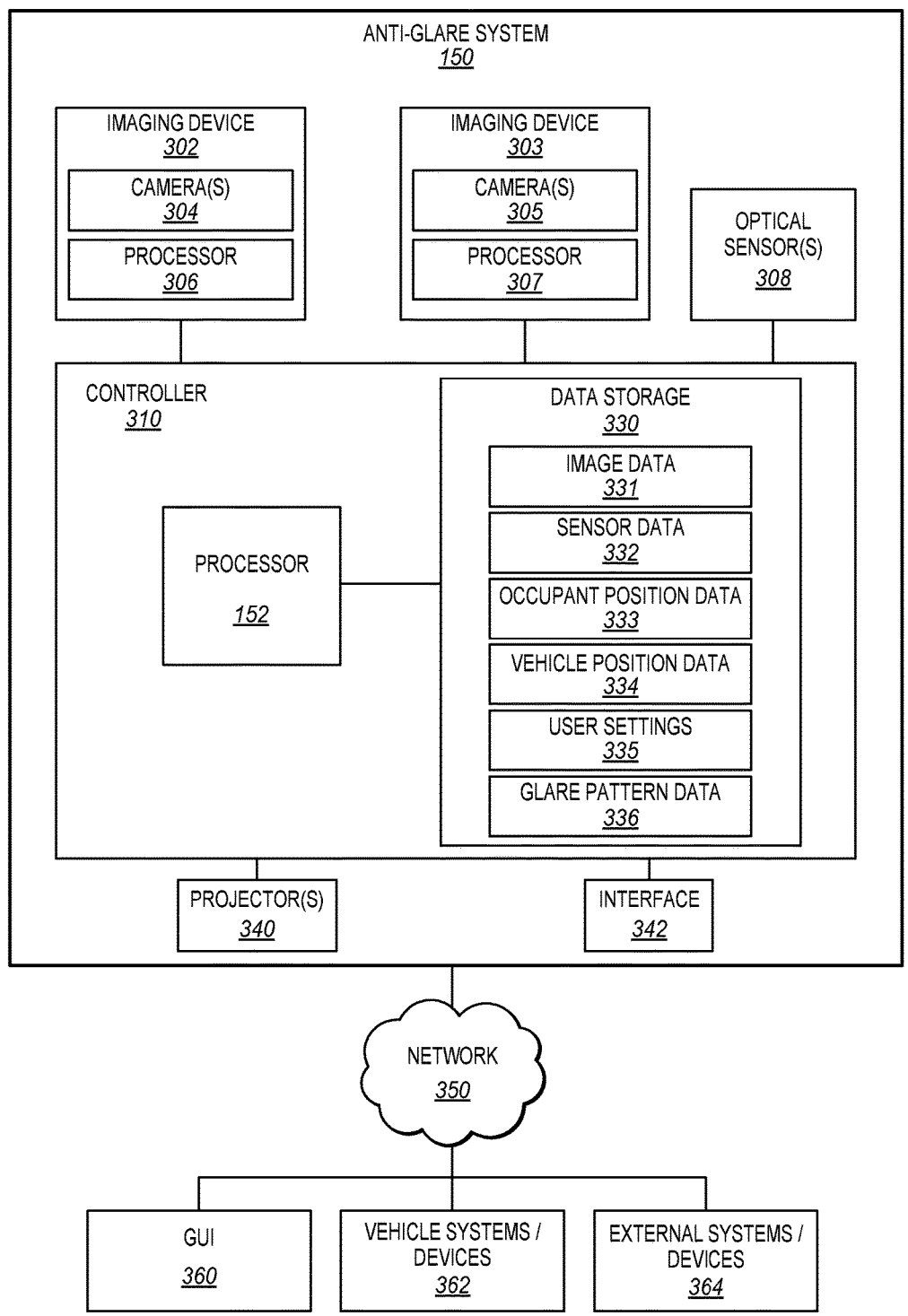
FIG. 3 is a block diagram of an anti-glare system in an exemplary embodiment.

FIG. 3 is a block diagram of the anti-glare system 150 in an exemplary embodiment. The anti-glare system 150 may be operable with the vehicle 100 of FIG. 1 or alternative vehicles, component configurations, etc. The controller 310 implements the processor 152 and data storage 330 (e.g., the memory 154 of FIG. 1 or another memory device) which may include image data 331, sensor data 332, occupant position data 333, vehicle position data 334, user settings 335, and glare pattern data 336. The anti-glare system 150 may include one or more imaging device(s) 302-303, each having one or more respective camera(s) 304-305 to capture images and processor(s) 306-307 to process the images. The processed image data may be sent to a controller 310 that controls the overall operation of the anti-glare system 150 and stored as image data 331 in data storage 330. Alternatively or additionally, the processor 152 may receive/process raw image data from the imaging devices 302-303 or from an external camera (e.g., camera 110 of FIG. 1) to store the image data 331 in data storage 330. The controller 310 also receives signals from optical sensor(s) 308 (e.g., optical sensors 121-128) that indicate changes in light intensity and potential glare events. The controller 310 may process raw sensor data via processor 152 and/or store the raw sensor data as sensor data 332 in data storage 330.

As further described in the examples below, one or more of the imaging devices 302-303 may be mounted to the vehicle 100 to observe the cabin 106 and its occupants to provide occupant position data 333 which may be stored by the controller 310 in data storage 330. The processor 152 may use the occupant position data 333 to generate images for the projector(s) 340 (e.g., projectors 140-141) based on the perspective of occupants in the vehicle. The anti-glare system 150 also includes an interface 342 to communicate over one or more wired or wireless networks 350. For instance, the anti-glare system 150 may exchange messages with a graphical user interface (GUI) 360, vehicle systems/devices 362, and/or external systems/devices 364. The GUI 360 enables a user to input data and configure the user settings 335 stored in data storage 330. The vehicle systems/devices 362 (e.g., global positioning system (GPS), speedometer, etc.) may provide vehicle position data 334 for data storage 330. The external systems/devices 364 may provide input/data from any system or device that is in communication with the anti-glare system 150 and/or the vehicle 100 from a remote location.

The processor 152 may also be configured to detect patterns in data to predict glare events on the windshield 101. As such, the processor 152 may use glare pattern data 336 in data storage 330 which may include one or more data items such as time of day, location, route, weather, occupant identifier, occupant height, or other variables and/or data combinations that serve as indicators for future glare events. In one embodiment, the processor 152 may be configured with machine learning circuitry or other type of learning function configured to learn patterns of glare on the windshield 101 as the vehicle 100 is operated over time. A user, or occupant, of the vehicle 100 may view/access the glare pattern data 336 via the GUI 360 to customize the dimming effect (and/or highlighting effect, or other customizable options in the user settings 335) for particular glare pattern features (e.g., time of day, vehicle operator, vehicle passenger, etc.). Additional details of operation and examples are described below.

Figure 4:
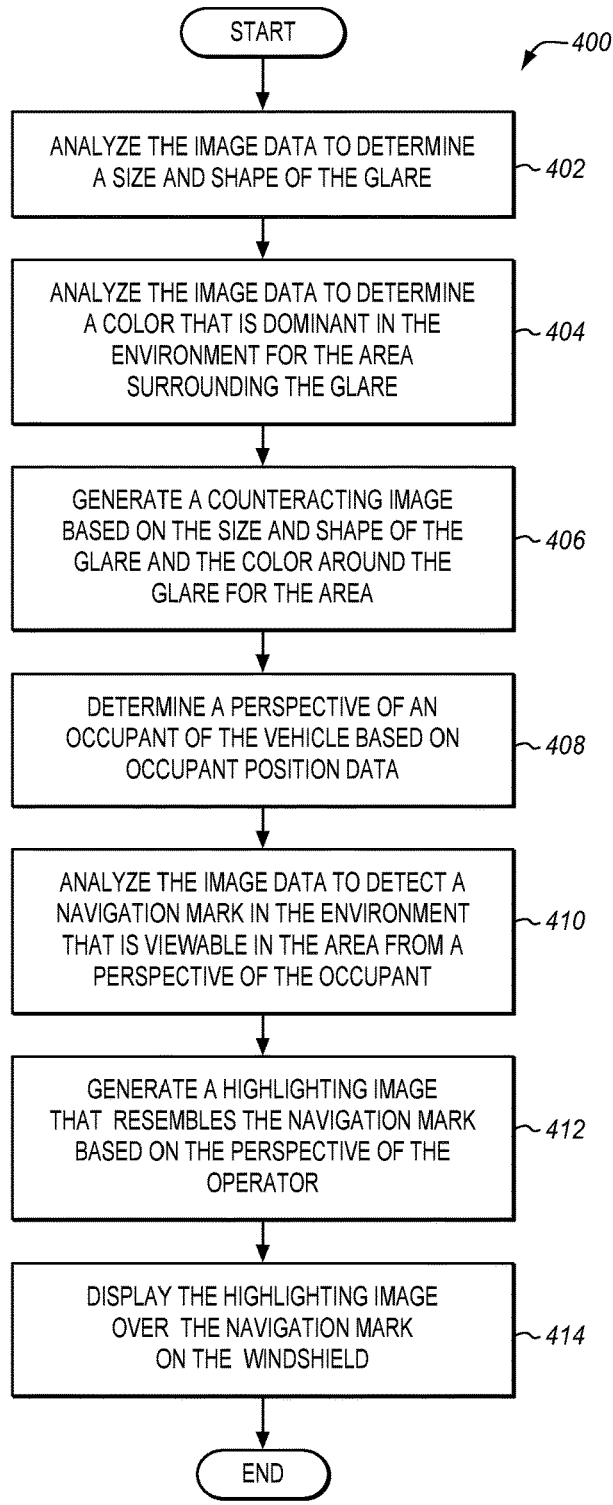
FIG. 4 is a flowchart of a method for reducing glare and highlighting objects seen through the windshield in an exemplary embodiment.

FIG. 4 is a flowchart of a method 400 for reducing glare and highlighting objects seen through the windshield 101 in an exemplary embodiment. The steps of method 400 will be described with reference to FIGS. 1 and 3, but those skilled in the art will appreciate that method 400 may be performed in other systems. The steps of the flowchart(s) described herein are not all inclusive and may include other steps not shown. The steps described herein may also be performed in an alternative order.

Assume, for this embodiment, that a glare event has been detected on the windshield 101. For instance, the processor 152 may receive a signal from one or more optical sensors 308 that indicates glare or a potential glare event on the windshield 101 for its corresponding zone (e.g., one of zones 111-118). As such, the processor 152 may categorize light intensity (e.g., glare) by different areas, zones, or regions of the windshield 101.

In step 402, the processor 152 analyzes the image data 331 to determine a size and shape of the glare on an area of the windshield 101. In step 404, the processor 152 analyzes the image data 331 to determine a color that is dominant in the environment for the area surrounding the glare. In step 406, the processor 152 generates a counteracting image based on the size and the shape of the glare and the color that is around the glare for the area. The processor 152 may therefore determine which zones are to be activated, detect and categorize the dominant color in each active zone, and detect the position of the glare within a zone. The processor 152 may maintain the counteracting image on the windshield 101 where glare occurs by sending discrete control signals to one or more projectors 340 using the zone-dominant color and/or size/position of the glare. Alternatively or additionally, the processor 152 may morph, alter, or modify the image projected by the projectors 340 based on vehicle position data 334, occupant position data 333, user settings 335, etc.

In step 408, the processor 152 determines a perspective of an occupant (e.g., operator or passenger) of the vehicle 100 based on the occupant position data 333. The processor 152 may generate one or more counteracting images on the windshield 101 based on the perspective of one or multiple occupants of the vehicle 100 (e.g., pilot and co-pilot or driver and passenger). Each occupant may be associated with different user settings 335 which the processor 152 may refer to in generating customized images for different zones as viewed by different occupants. Therefore, the view through the windshield 101 may be made comfortable and safe by all occupants of the vehicle 100. The processor 152 may use the relative positions of any of the cameras 110 and/or imaging devices 302-303 with respect to the occupants of the vehicle 100 to determine the perspective of the occupant.

In step 410, the processor 152 analyzes the image data 331 to detect a navigation mark in the environment that is viewable in the area from a perspective of the occupant. The navigation mark may include paint or markings on a runway or road (e.g., parallel/parallax solid or dashed lines), a traffic sign, a cone, etc. Alternatively or additionally, the processor 152 may be configured to detect other environmental objects such as trees, power lines, sidewalk curbs, buildings, persons, wildlife, etc. The processor 152 may therefore recognize scene features that exist in one or more of the zones 111-118 of the windshield 101. In some embodiments, one or more of the cameras 110 and/or imaging devices 302-303 may be mounted to an external surface of the vehicle 100 (e.g., the nose 104, the roof 105, or other surface outside of the cabin 106) with a field of view in front of the vehicle 100 (e.g., in the direction of travel of the vehicle 100). The processor 152 may obtain image data from this camera or imaging device to detect scene features in the environment without the potential for glare to obstruct objects through the windshield 101.

In step 412, the processor 152 generates a highlighting image that resembles the navigation mark (e.g., shape, size, location, etc.) based on the perspective of the operator. The processor 152 may generate the highlighting image to have a shade that contrasts with the color that is dominant for the zone of the windshield 101 having glare. Alternatively or additionally, the processor 152 may modify or morph the highlighting image projected by the projectors 340 based on vehicle position data 334, occupant position data 333, user settings 335, etc. In step 414, the processor 152 directs one or more projectors 340 to display the highlighting image over the navigation mark on the windshield 101. Alternatively or additionally, the processor 152 may generate and the direct the display of a highlighting image that resembles other types of environmental objects which may be seen through the windshield 101. Thus, the anti-glare system 150 may mask glare on the windshield 101 in real-time, and may further project lines or other shapes on top of the mask so as not to block out objects in the environment that may direct navigation of the vehicle 100. It will be appreciated that, while the description herein often refers to a single glare event, one of sensors 121-128, one of zones 111-118 or areas, a counteracting/highlighting image, an activated one of projectors 140-141, etc., that alternative numbers and combinations of such components in relation to the windshield 101 is contemplated. For example, the anti-glare system 150 may detect multiple instances of glare on one or multiple zones 111-118 of the windshield 101 and/or project multiple counteracting/highlighting images in one or more of the zones 111-118. Further illustrative examples are discussed below.

EXAMPLES

Figure 5:
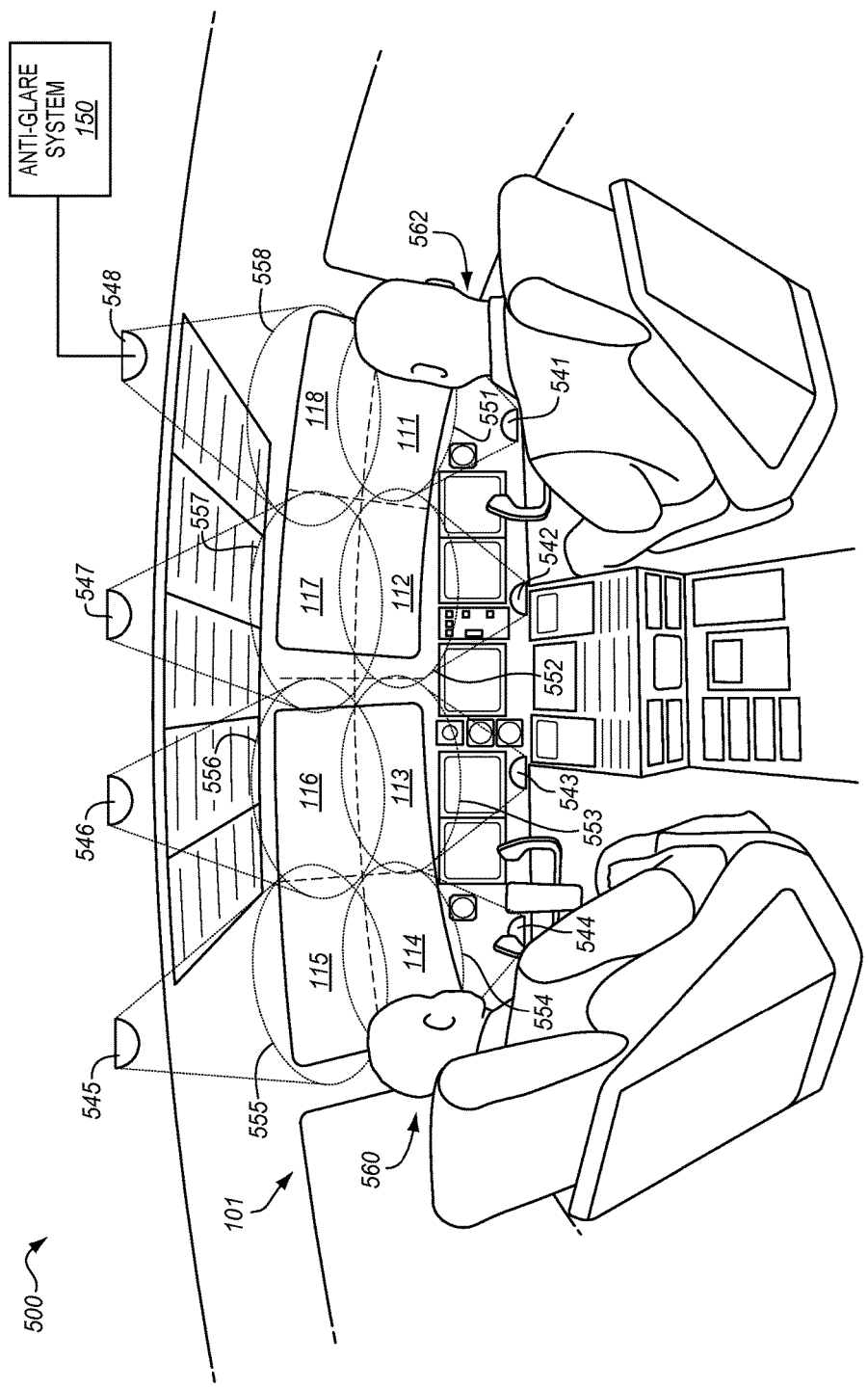
FIG. 5 illustrates a view of a cockpit with an anti-glare system in an exemplary embodiment.

FIG. 5 illustrates a view of a cockpit 500 with the anti-glare system 150 in an exemplary embodiment. In this example, the windshield 101 of the cockpit 500 is divided into eight different zones 111-118 via optical sensors (e.g., via the optical sensors 121-128 of FIG. 1, not shown in FIG. 5) mounted around the windshield 101 on an exterior of the aircraft. Also, the anti-glare system 150 includes, or is coupled with, eight different projectors 541-548 each capable of displaying projected images 551-558 onto the windshield 101 (or another transparent object between the projectors 541-548 and the windshield 101). As illustrated in FIG. 5, the projectors 541-548 may be independently controlled to project images with different shapes and at different locations onto the windshield 101. The anti-glare system 150 may control the projectors 541-548 to overlap the projected images 551-558. A camera (e.g., the camera 110 or the imaging devices 302-303) not shown in FIG. 5, provides the view of (or from) the cockpit 500 behind the pilot 560 and the co-pilot 562. As such, the anti-glare system 150 may control the projectors 541-548 by tracking a relative view of the environment in front of the windshield 101 as seen by the pilot 560 and the co-pilot 562.

Figure 6:
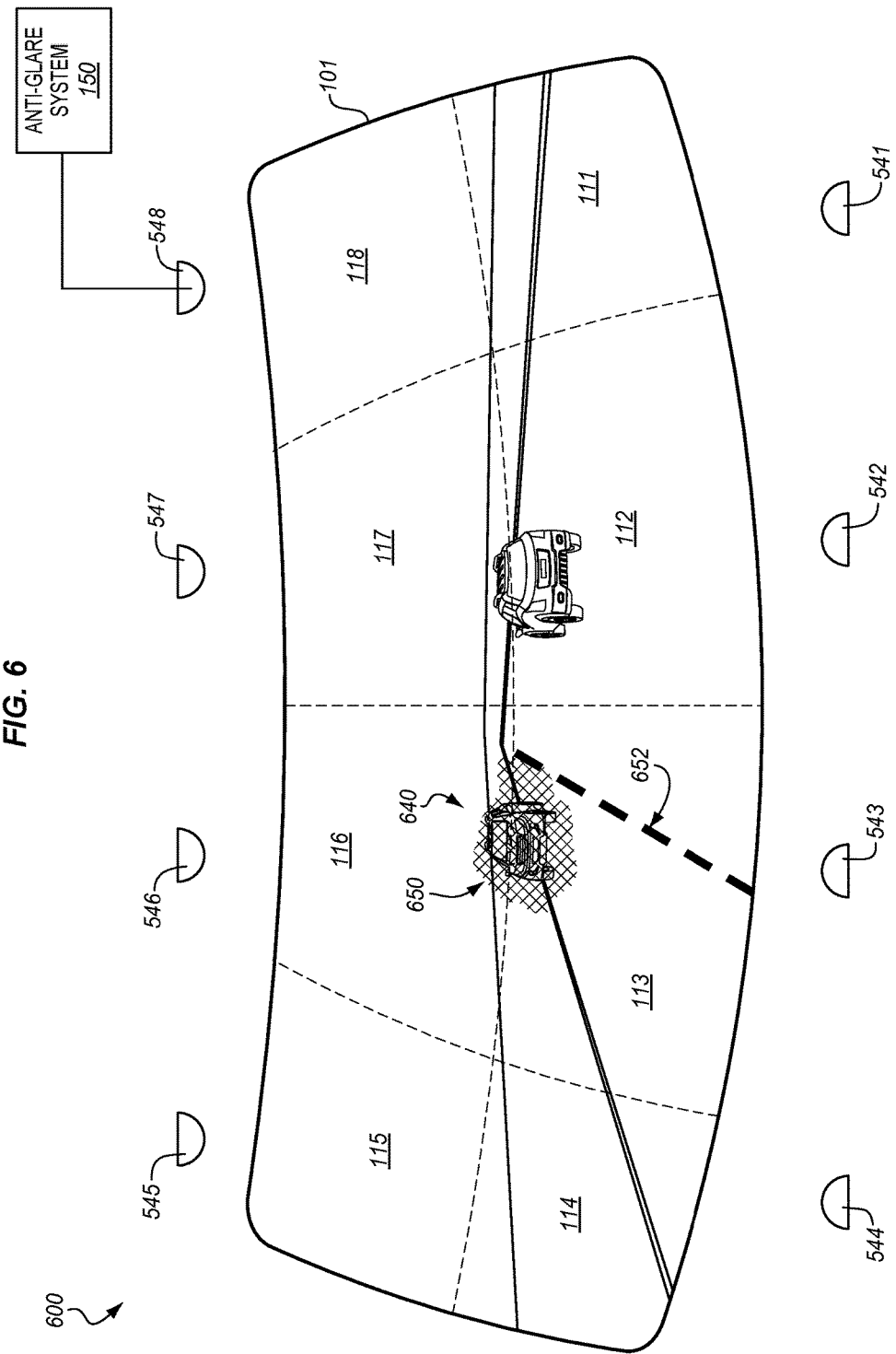
FIG. 6 illustrates a view of a car with an anti-glare system in an exemplary embodiment.

FIG. 6 illustrates a view of a car 600 with the anti-glare system 150 in an exemplary embodiment. As shown in this example, glare 650 from the oncoming headlights of another car is seen on the windshield 101 through the view of the car 600. The anti-glare system 150 receives a signal from one of the optical sensors corresponding to a region of the windshield 101 having the glare 650 (e.g., the optical sensor 123 corresponding with zone 113, not shown in FIG. 5). The anti-glare system 150 then obtains image data from a camera (e.g., the camera 110 or the imaging devices 302-303) not shown in FIG. 6. The anti-glare system 150 may target/extract image data which corresponds with a location of the glare 650 on windshield 101 and/or a location of the glare 650 within zone 113 (e.g., associated with the sensor alert) with respect to a view of a driver/passenger inside the vehicle 100. The anti-glare system 150 may confirm the glare 650 using the obtained image data and/or proceed to further image analysis for object detection and glare reduction. In this example, the anti-glare system 150 determines that zone 113 of the windshield 101 is impacted by the glare 650. The anti-glare system 150 detects the dominant color 640 (e.g., grey) for zone 113 (e.g., excluding the color of the glare 650). The anti-glare system 150 further detects that a navigation mark 652 is present in the environment for zone 113.

Figure 7:
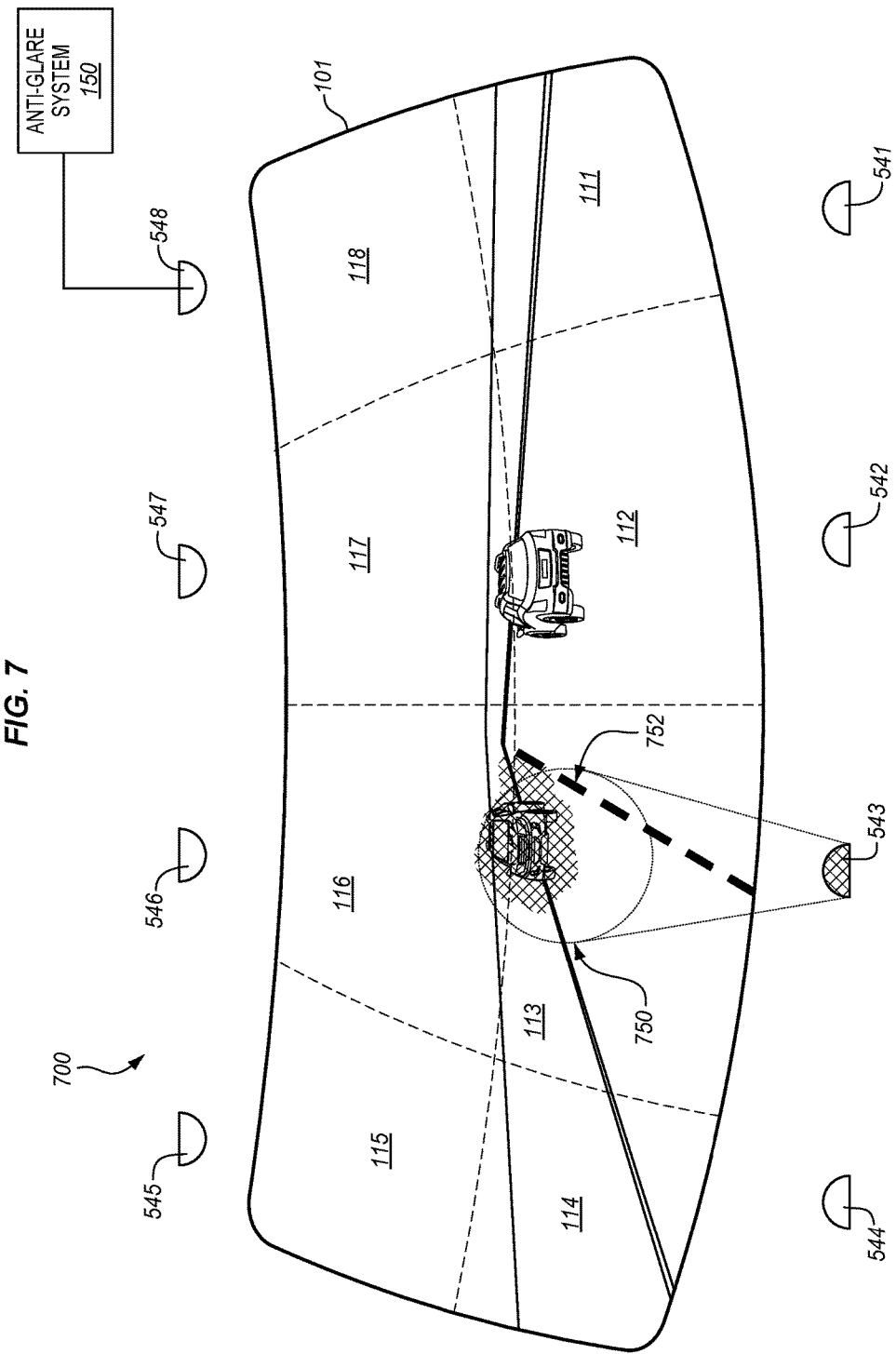
FIG. 7 illustrates a view of a car with an anti-glare system activating one or more projectors in an exemplary embodiment.

FIG. 7 illustrates a view of a car 700 with the anti-glare system 150 activating one or more projectors 541-548 in an exemplary embodiment. As shown here, the anti-glare system 150 determines to activate projector 543 to reduce the glare 650 in zone 113. The anti-glare system generates a counteracting image 750 that is based on the dominant color 640, the location of the glare 650 in zone 113 (or windshield 101), and/or the size/shape of the glare 650 with respect to a view of an occupant of the vehicle 100. In this example, the anti-glare system 150 generates the counteracting image 750 with a grey shade to blend with the environment viewed through the windshield 101 in zone 113. Additionally, the anti-glare system 150 generates a highlighting image 752 to be overlaid on top of the navigation mark 652 with respect to a view of a driver/passenger inside the vehicle 100. The anti-glare system 150 may direct the same projector (e.g., projector 543) or a different projector to display the highlighting image 752. The anti-glare system 150 may generate the highlighting image 752 to have a similar (e.g., same, congruent, or otherwise compatible) color/shade and/or features (e.g., dashed line, solid, etc.) as the navigation mark 652 (or other object it represents), to have a contrasting color/shade as compared to the dominant color 640 determined for the zone 113, and/or to have a color, shade, outline/fill according to the user settings 335.

Figure 8:
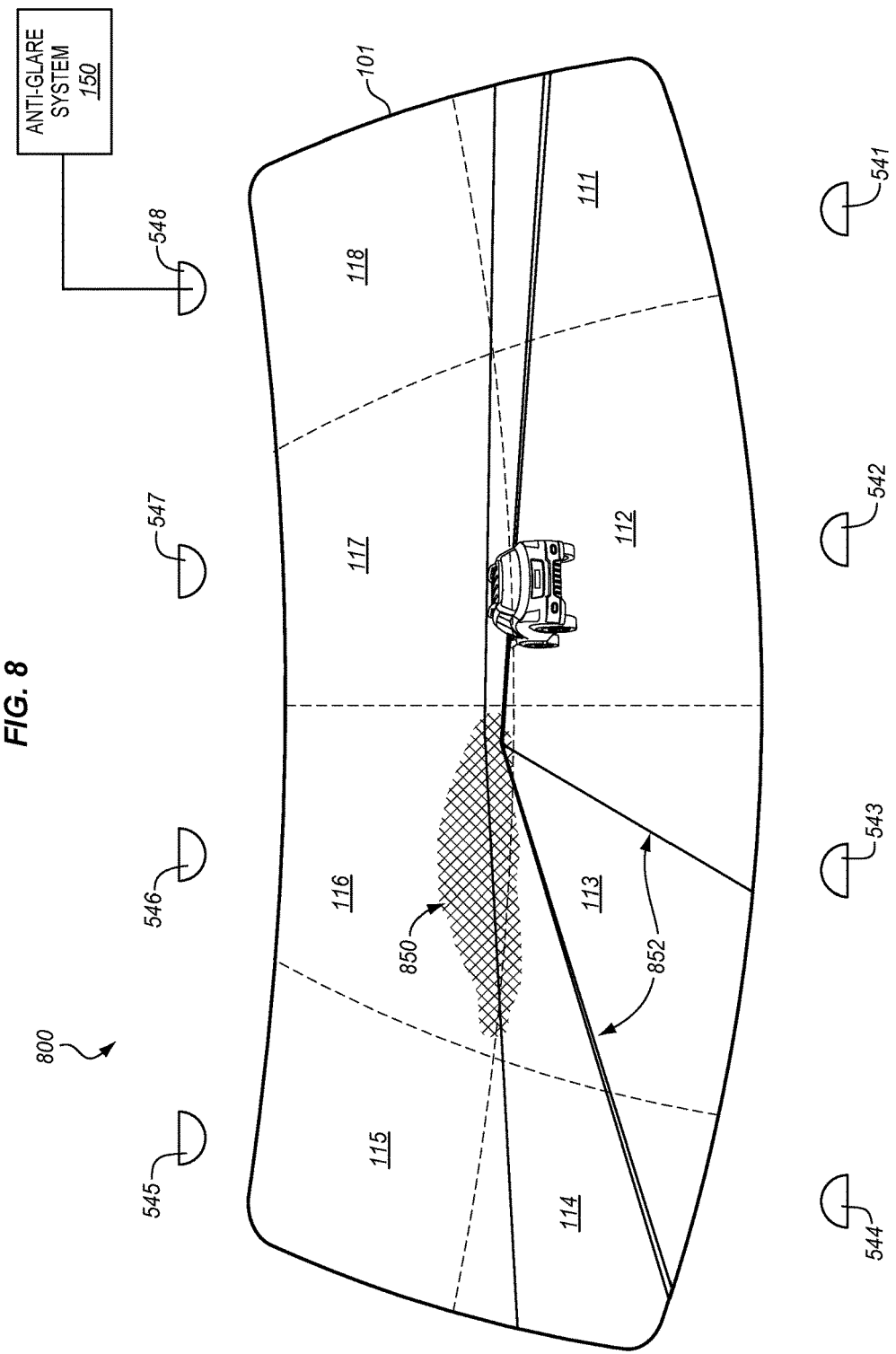
FIG. 8 illustrates a view of a car with an anti-glare system in another exemplary embodiment.

FIG. 8 illustrates a view of a car 800 with the anti-glare system 150 in another exemplary embodiment. In this example, glare 850 from the sun is seen on the windshield 101 through the view of the car 800. The anti-glare system 150 receives a signal from one of the optical sensors corresponding to regions of the windshield 101 having the glare 850 (e.g., the optical sensors 122-123 and 126-127 corresponding with zones 112-113 and 116-117, not shown in FIG. 8). Additionally, the anti-glare system 150 detects parallel lines 852 in zone 113.

Figure 9:
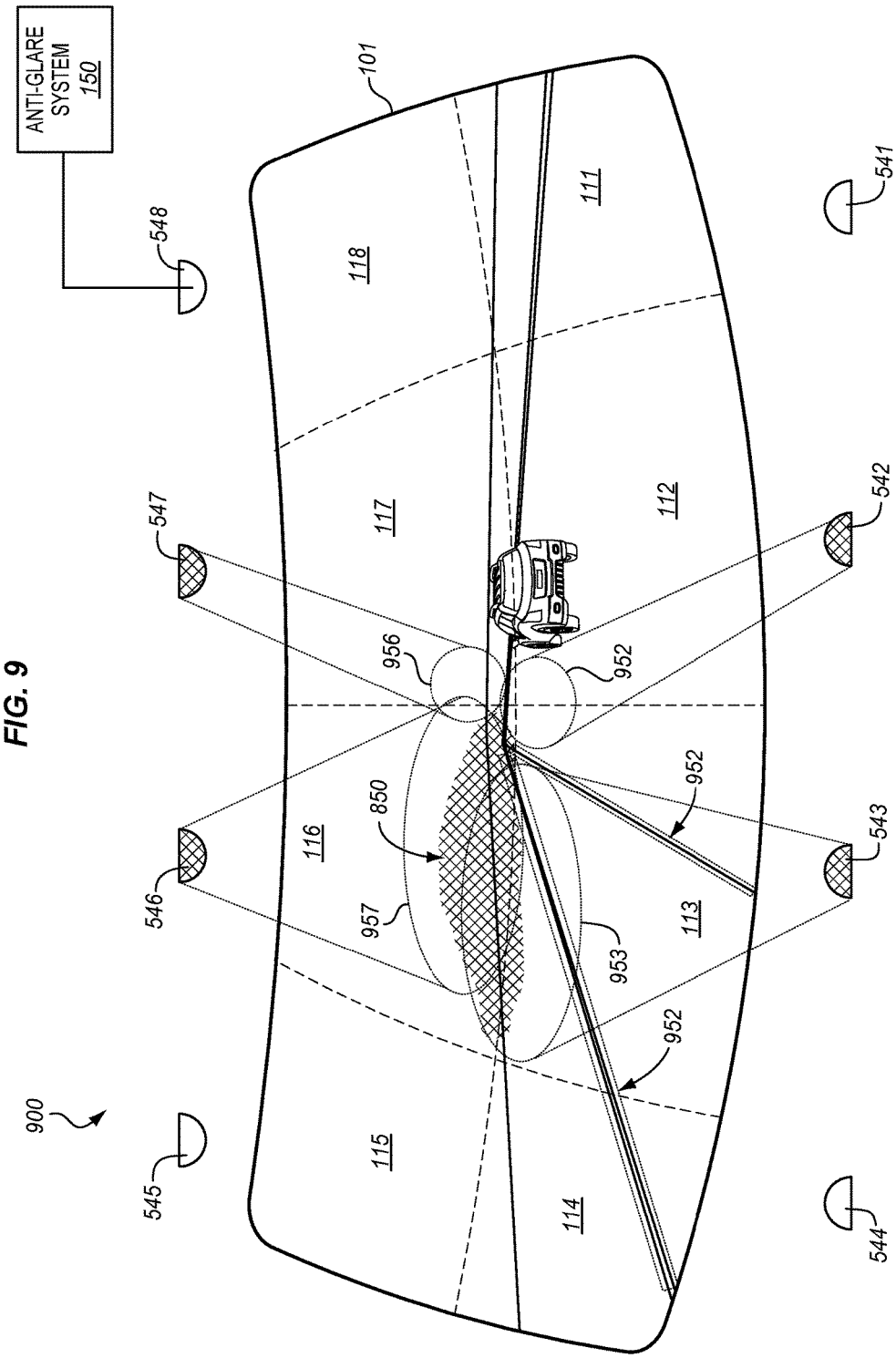
FIG. 9 illustrates a view of a car with an anti-glare system activating one or more projectors in another exemplary embodiment.

FIG. 9 illustrates a view of a car 900 with the anti-glare system 150 activating one or more projectors 541-548 in another exemplary embodiment. As shown here, the anti-glare system 150 determines to activate projectors 542-543 and 546-547 to reduce the glare 850 in zones 112-113 and 116-117. The anti-glare system 150 generates counteracting images 952-953 and 956-957 for respective projectors 542-543 and 546-547 and instructs display according to a respective view of an occupant of the vehicle 100. Additionally, the anti-glare system 150 generates a highlighting image 752 to be overlaid on top of the parallel lines 852 detected in zone 113.

Any of the various control elements (e.g., electrical or electronic systems/components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. An anti-glare system for a windshield of a vehicle, the anti-glare system comprising:
   a camera configured to capture image data of an environment in front of the vehicle;
   a projector configured to project an image on the windshield;
   a sensor configured to monitor light intensity for an area of the windshield; and
   a controller configured, in response to detecting glare impinging on the area of the windshield via the sensor, to analyze the image data captured for the area of the windshield to determine a location of the glare in the area based on the image data, to detect a navigation mark in the environment that is viewable in the area from a perspective of an operator of the vehicle, to determine a characteristic of the environment for the area based on the image data, to generate a counteracting image based on the characteristic of the environment for the area, to generate a highlighting image that resembles the navigation mark based on the perspective of the operator, to direct the projector to project the counteracting image on a surface of the windshield at the location to reduce the glare, and to direct the projector to project the highlighting image on the windshield based on the perspective of the operator.

2. The anti-glare system of claim 1 wherein:
the controller is configured to determine a color that is dominant in the environment for the area surrounding the glare, and to generate the counteracting image based on the color.

3. The anti-glare system of claim 1 wherein:
the controller is configured to determine a color that is dominant in the environment for the area surrounding the glare, to generate the counteracting image having a shade that is congruent with the color, to generate the highlighting image having a shade that contrasts with the color, and to direct the projector to display the counteracting image and the highlighting image in the area of the windshield.

4. The anti-glare system of claim 1 wherein:
the controller is configured to determine a size and a shape of the glare based on the image data, and to generate the counteracting image based on the size and the shape of the glare.

5. The anti-glare system of claim 1 wherein:
the controller is configured to receive location data of a passenger inside the vehicle, and to generate the counteracting image based in part on the location data of the passenger.

6. The anti-glare system of claim 1 further comprising:
sensors configured to monitor light intensity for different areas of the windshield; and
multiple projectors independently controllable by the controller, each projector configured to display images in one of the different areas of the windshield;
wherein the controller is configured, in response to detecting glare impinging on one or more of the different areas of the windshield via the sensors, to generate one or more counteracting images for the one or more of the different areas, and to direct a subset of the projectors to display the one or more counteracting images in the one or more of the different areas of the windshield.

7. A method comprising:
capturing image data of an environment in front of a vehicle;
monitoring light intensity for an area of a windshield of the vehicle;
detecting glare impinging on the area of the windshield;
analyzing the image data captured for the area of the windshield to determine a location of the glare in the area based on the image data;
detecting a navigation mark in the environment that is viewable in the area from a perspective of an operator of the vehicle;
determining a characteristic of the environment for the area based on the image data;
generating a counteracting image based on the characteristic of the environment for the area;
generating a highlighting image that resembles the navigation mark based on the perspective of the operator;
projecting the counteracting image on a surface of the windshield at the location to reduce the glare; and
projecting the highlighting image on the windshield based on the perspective of the operator.

8. The method of claim 7 further comprising:
determining a color that is dominant in the environment for the area surrounding the glare; and
generating the counteracting image based on the color.

9. The method of claim 7 further comprising:
determining a color that is dominant in the environment for the area surrounding the glare;
generating the counteracting image having a shade that is congruent with the color;
generating the highlighting image having a shade that contrasts with the color; and
directing a projector to display the counteracting image and the highlighting image in the area of the windshield.

10. The method of claim 7 further comprising:
determining a size and a shape of the glare based on the image data; and
generating the counteracting image based on the size and the shape of the glare.

11. The method of claim 7 further comprising:
receiving location data of a passenger inside the vehicle; and
generating the counteracting image based in part on the location data of the passenger.

12. The method of claim 7 further comprising:
monitoring, with sensors, light intensity for different areas of the windshield;
in response to detecting glare impinging on one or more of the different areas of the windshield via the sensors:
generating one or more counteracting images for the one or more of the different areas; and
directing at least one of multiple, independently controllable projectors to display the one or more counteracting images in the one or more of the different areas of the windshield.

13. A non-transitory computer readable medium embodying programmed instructions which, when executed by a processor, are operable for performing a method comprising:
capturing image data of an environment in front of a vehicle;
monitoring light intensity for an area of a windshield of the vehicle;
detecting glare impinging on the area of the windshield;
analyzing the image data captured for the area of the windshield to determine a location of the glare in the area based on the image data;
detecting a navigation mark in the environment that is viewable in the area from a perspective of an operator of the vehicle;
determining a characteristic of the environment for the area based on the image data;
generating a counteracting image based on the characteristic of the environment for the area;
generating a highlighting image that resembles the navigation mark based on the perspective of the operator;
projecting the counteracting image on a surface of the windshield at the location to reduce the glare; and
projecting the highlighting image on the windshield based on the perspective of the operator.

14. The medium of claim 13 wherein the method further comprises:
determining a color that is dominant in the environment for the area surrounding the glare; and
generating the counteracting image based on the color.

15. The medium of claim 13 wherein the method further comprises:
   determining a color that is dominant in the environment for the area surrounding the glare;
   generating the counteracting image having a shade that is congruent with the color;
   generating the highlighting image having a shade that contrasts with the color; and
   directing a projector to display the counteracting image and the highlighting image in the area of the windshield.

16. The medium of claim 13 wherein the method further comprises:
   determining a size and a shape of the glare based on the image data; and
   generating the counteracting image based on the size and the shape of the glare.

17. The medium of claim 13 wherein the method further comprises:
   receiving location data of a passenger inside the vehicle; and
   generating the counteracting image based in part on the location data of the passenger.

* * * * *